Aug. 17, 1965         H. A. GILBERT         3,200,819
SMOKELESS NON-TOBACCO CIGARETTE
Filed April 17, 1963
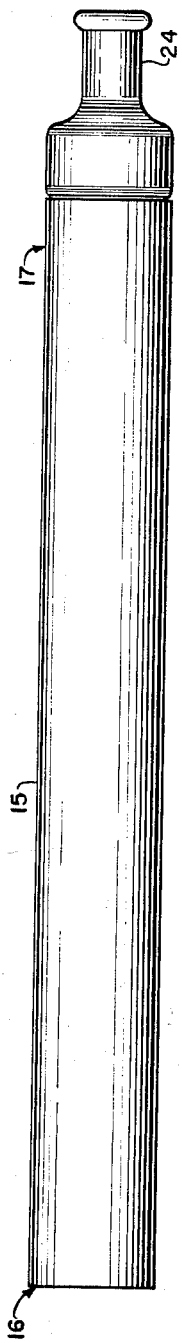
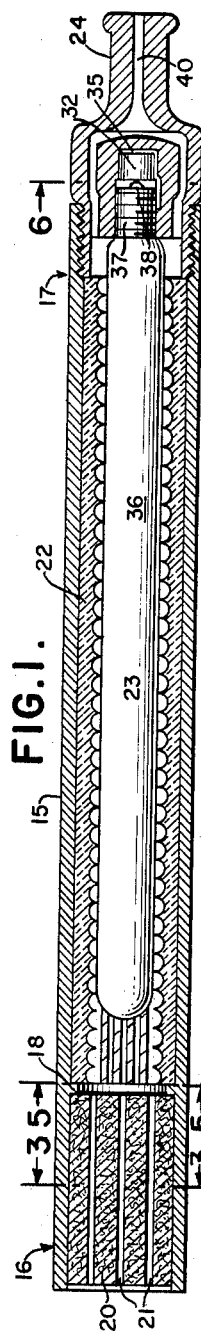
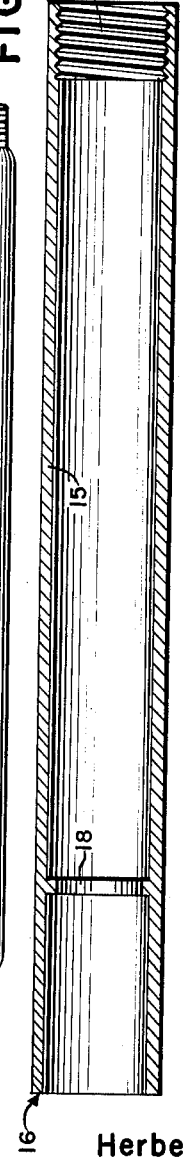
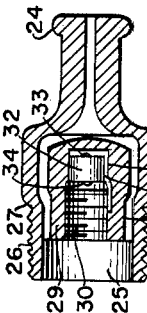
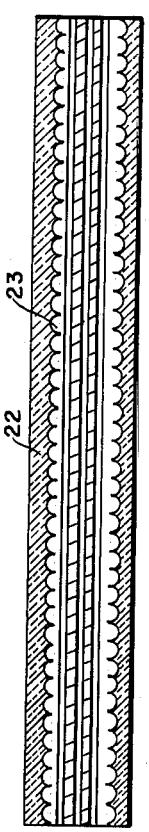
INVENTOR
Herbert A. Gilbert
BY Mawhinney & Mawhinney
ATTORNEYS

United States Patent Office 3,200,819
Patented Aug. 17, 1965

3,200,819
SMOKELESS NON-TOBACCO CIGARETTE
Herbert A. Gilbert, 278 McKinley Road, Beaver Falls, Pa.
Filed Apr. 17, 1963, Ser. No. 273,624
10 Claims. (Cl. 128—208)

The present invention relates to a smokeless non-tobacco cigarette and has for an object to provide a safe and harmless means for and method of smoking by replacing burning tobacco and paper with heated, moist, flavored air; or by inhaling warm medication into the lungs in case of a respiratory ailment under direction of a physician.

Another object of the invention is to provide an article of manufacture resembling a cigarette by which air may be drawn through a porous substance of a cartridge which has been moistened with a chemically harmless flavoring preparation, combining moisture and taste following which the moist and flavored air passes through a section of the device heated by a suitable heating element so that warm, moist and flavored air is drawn into the mouth and if desired into the lungs of the user.

A further object of the invention is to provide a smokeless non-tobacco cigarette in which provision is made for circulating the fluid around the heating element in a turbulent manner to suitably raise the temperature of the inhalent mixture, with the purpose that the temperature of the flavored air may approximate that of cigarette smoke.

A further object is to insulate the heat source so that the "cigarette" may be held in the fingers without discomfort to the user's hand.

With the foregoing and other objects in view, the invention will be more fully described hereinafter, and will be more particularly pointed out in the claims appended hereto.

In the drawings, wherein like symbols refer to like or corresponding parts throughout the several views:

FIGURE 1 is a side elevational view of the completed article constructed in accordance with the invention in simulation of a cigarette.

FIGURE 2 is a longitudinal section taken through the same with all interior parts assembled.

FIGURE 3 is a cross-sectional view taken on the line 3—3 in FIGURE 2.

FIGURE 4 is a side elevational view of a form of flavor cartridge employed.

FIGURE 5 is a transverse sectional view taken on the line 5—5 in FIGURE 2.

FIGURE 6 is a similar view taken on the line 6—6 in FIGURE 2.

FIGURE 7 is a longitudinal sectional view of a form of outer tube.

FIGURE 8 is a similar view of a form of insulating liner.

FIGURE 9 is a longitudinal sectional view of a form of mouthpiece that may be employed.

FIGURE 10 is a side elevational view of a form of heating element or vacuum tube or bulb that may be employed.

Referring more particularly to the drawings, 15 designates an external tube made preferably in the size, color and form of a cigarette, such tube having an outer end portion 16 and an inner end portion 17.

Subdividing the interior space of the external tube is an internal shoulder 18 which is preferably closer to the outer end portion 16 than to the opposite inner end portion 17, thus dividing the tube into relatively short and substantially longer chambers.

The tube 15 is supplied at the inner end portion 17 with internal threads 19 or some other means of connection for a mouthpiece as later described.

In the outer end portion 16 is detachably fitted a flavor cartridge 20 of some suitable absorbent material, preferably having longitudinal spaced passages 21 therethrough of a small diameter. The cartridge 20 is abutted against the outer edge of the internal shoulder 18 and is of an external diameter to fit snugly into the outer end portion 16 so that it will be held therein by friction or other suitable means.

Within the more forward chamber of the outer tube 15 is received a tubular liner 22 preferably of insulating material and having an internal wall 23 of a form and character to tumble the air or create turbulence therein. This internal wall may be spiralled or rifled as indicated.

A mouthpiece 24 is affixed to the inner end portion 17 of the tube 15 in any appropriate manner, preferably detachably as by external threads 26 on the hollow shank 25 of the mouthpiece which mate with the internal threads 19 in the inner end portion of the outer tube 15.

As shown in FIGURE 2, the free outer end of the hollow shank 25, when fitted home in the outer tube, will encounter and push the insert 22 against the inner wall of the internal shoulder 18 thus holding the insert 22 immovably in place.

The hollow shank 25 will preferably have an outstanding shoulder 27 forwardly of the threads 26 to engage the inner end of the tube 15 in the completely assembled position of the mouthpiece 24 relatively to the outer tube 15.

As best seen in FIGURE 6 showing a cross-section through the hollow shank portion 25 of the mouthpiece, a spider formation is shown providing air draft spaces 28 between the hollow shank 25 and an inner ring 29 spaced inwardly from the hollow shank 25 and connected therewith by radial arms 39. The air draft spaces 28 communicate with the suction orifice 40 of the mouthpiece at the inner end and at the outer end with the space circumscribed by the inner wall 23 of the tubular insert 22.

Within the inner ring 29 is a threaded electric socket 30 and forwardly thereof a battery cavity 31 for detachably receiving a battery 32 having an inner contact 33 and an outer contact 34 with a contact strip 35 between the inner contact 33 and the socket 30.

The heating element is preferably a vacuum tube or bulb 36 having a screw plug 37 for detachable engagement with the socket 30. The screw plug 37 has an end contact 38 adapted to close against the outer battery contact 34. The bulb or tube 36, similar to a light bulb, is preferably elongated and of a diameter to fit within the insert 22 in such manner as to provide an elongated heating passage throughout the length of the bulb and around the complete circumference of the bulb 36.

In assembly, the flavor cartridge 20 can be introduced and removed without regard to the other units of the device.

Before the mouthpiece 24 is assembled to the external tube 15, the liner 22 is slid through the open inner end portion of the tube until the outer end of the liner 22 encounters the internal shoulder 18. The bulb 36 will be mounted to the socket 30 while the mouthpiece 24 is detached from the tube 15 whereupon the bulb 36 may be introduced into the insert 22 as the mouthpiece 24 is put into place and rotated to effect attachment of the mouthpiece to the outer tube 15. The final home position of the parts is indicated in FIGURE 2 in which the hollow shank 25 engages the inner end of the insert 22 while the outer end of the insert is abutted against the internal shoulder 18.

When the bulb 36 is assembled to the socket 30 its tip end 38 will engage the inner battery contact 33 and complete the circuit through the filament of the bulb 36 by the contact strip 35. Thus the bulb 36 will be illuminated or energized before assembly to the external tube 15.

The battery 32 is removable so that when exhausted, a fresh dry battery may be substituted, access to the same being had by first unscrewing the mouthpiece 24 and withdrawing the bulb 36 and subsequently removing the bulb 36 from its socket 30.

The insert 22 is preferably of a ceramic material. By the act of inhalation through the mouthpiece 24, air from the ambient atmosphere is drawn in through the passages 21 of the cartridge 20 which has been impregnated with suitable flavoring material which is picked up by the inhaled air and such air then passes into the heating chamber and is caused to flow around the heating bulb 36, the heated and flavored air finally passing through the mouthpiece 24 into the mouth and also, if desired, into the lungs.

The tumbling of the air around the heat source provides for uniformity of heat transfer while the insert 22 also serves to insulate the basic tube 15 so that it does not become hot to the hand of the user.

The cartridge 20 may be composed of a porous, moisture-holding substance such as felt or plastic sponge although there are many other materials which will serve the purpose.

The impregnation will be by a harmless flavored chemical compound. As suggested, such compounds may be solutions ranging from slightly mentholated water to a solution which would simulate artificially the flavor of Scotch whisky. Many other solutions and flavors may be employed.

The outer tube may be of plastic, fiber glass or any other appropriate material.

The member 24 as shown in the drawings is shaped in the fashion of a mouthpiece but it is not necessary that it be so shaped. The tubular shape of the outer tube 15 may be continued to the right hand end of the mouthpiece if desired to further the illusion of a cigarette.

Some of the advantages of the invention are:
(a) There is no open flame or fire and fire hazard is therefore eliminated.
(b) Nothing is consumed so that there is no smoke, ashes or dirt.
(c) Since the air which enters the lungs of the user comes into contact with only inert materials, there is nothing of an injurious nature being placed into the respiratory system of the user.
(d) Heated medication for respiratory ailments may be induced into the lungs of a user of this invention should a physician feel the same desirable.
(e) Persons who wish to smoke but have been advised against such a practice by their doctor may use this invention to maintain the satisfaction of smoking without any of its disadvantages.
(f) By changing the liquid employed to moisten the cartridge 20, a variety of tastes may be imparted to the warm moist air which serves to duplicate the smoking sensation.
(g) The size and shape of the device according to this invention may approximate the size and shape of a cigarette; therefore its use will not call undue attention to the user. A white coloration of the basic tube 15 and mouthpiece will further add to this illusion.

It is to be understood that various details of the exemplary structures chosen to illustrate the invention are capable of being modified and in some cases omitted without departing from the broad principles of the invention as defined by the more broadly worded of the appended claims.

What is claimed is:
1. A smokeless non-tobacco cigarette comprising
(a) an external tube having inner and outer end portions,
(b) a flavor cartridge in the outer end portion,
(c) heating means in the tube,
(d) a tubular liner also in the tube at least partially surrounding and spaced from the heating means and having
(e) an internal wall shaped to produce turbulence in the air stream drawn through the space between the heating means and tubular liner,
(f) a mouthpiece on the inner end portion of the tube for drawing atmosphere air by inhaling through the outer end portion of the tube including the cartridge and through the space between the heating means and liner and into the mouth of the user, and said cartridge having air passages therethrough communicating at the outer end of the tube with the atmosphere and at the inner end of the tube with said space and ultimately with the mouthpiece for permitting air to be drawn past the flavor cartridge for inhalation by the user at the mouthpiece.

2. A smokeless non-tobacco cigarette as claimed in claim 1 in which the internal wall (e) of the tubular liner is rifled to produce the turbulent effect recited.

3. A smokeless non-tobacco cigarette as claimed in claim 1 in which the tubular liner (d) is of heat insulating material and in which the internal wall (e) is spirally grooved to tumble the air around the heating means.

4. A smokeless non-tobacco cigarette as claimed in claim 1 in which the flavor cartridge (b) comprises
(h) a porous substance moistened with
(i) a chemically harmless flavoring material.

5. A smokeless non-tobacco cigarette as claimed in claim 4 in which the porous substance (h) is traversed by
(j) air passages running lengthwise of the tube opening at the outer end to atmosphere and at the inner end to the space between the heating means and the liner.

6. A smokeless non-tobacco cigarette as claimed in claim 1 in which the tube has
(h) an inwardly projecting division shoulder constituting a stop against the rear edge of which the flavor cartridge is abutted and against the forward edge of which the rear end of the liner is abutted.

7. A smokeless non-tobacco cigarette as claimed in claim 1 in which the mouthpiece (f) includes
(h) a hollow shank detachably interlocked with the external tube and abutted against the inner end portion of the liner.

8. A smokeless non-tobacco cigarette comprising
(a) on external tube having inner and outer end portions,
(b) a flavor cartridge in the outer end portion,
(c) heating means in the tube,
(d) a tubular liner also in the tube at least partially surrounding and spaced from the heating means and having
(e) an internal wall shaped to produce turbulence in the air stream drawn through the space between the heating means and tubular liner,
(f) a mouthpiece on the inner end portion of the tube for drawing atmospheric air by inhaling through the outer end portion of the tube including the cartridge and through the space between the heating means and liner and into the mouth of the user,
(g) said cartridge having air passages therethrough communicating at the outer end of the tube with the atmosphere and at the inner end of the tube with said space and ultimately with the mouthpiece for permitting air to be drawn past the flavor cartridge for inhalation by the user at the mouthpiece,
(h) an electric socket in the mouthpiece, said heating means being an electric bulb having
(i) a plug entered into the socket, and
(j) a battery also in the mouthpiece having electric connection to the socket and exposed in the socket to the plug for energizing the electric bulb.

9. A smokeless non-tobacco cigarette as claimed in claim 8 further comprising
(k) a battery receiving cavity in the mouthpiece inwardly of the socket,
(l) a battery removably mounted through the socket into the cavity and having
(m) inner and outer contacts, said plug having
(n) an inner end contact for closing against said outer contact, and
(o) a contact strip connecting the inner battery contact with the socket.

10. A smokeless non-tobacco cigarette as claimed in claim 1 in which said mouthpiece (f) comprises
(h) a spider internal construction having
(i) spaced internal and external concentric rings having
(j) air draft spaces therebetween,
(k) radiating angularly spaced arms connecting the rings,
(l) a threaded socket in the inner ring,
(m) a battery cavity in the inner ring inwardly of the socket,
(n) a battery in the cavity electrically connected to the socket, said heating means having a screw plug adapted to be entered into the socket and electrically connected to the battery.

References Cited by the Examiner

UNITED STATES PATENTS

| | | | |
|---|---|---|---|
| 726,037 | 4/03 | Ferre | 128—200 |
| 962,617 | 6/10 | Bucceri | 128—201 |
| 2,204,312 | 6/40 | Huxter | 128—192 |
| 2,696,382 | 12/54 | Gelardin. | |
| 2,702,033 | 2/55 | Pardeman | 128—201 |
| 2,721,551 | 10/55 | Lobl | 128—208 |
| 2,860,638 | 11/58 | Bartolomeo | 128—201 |

FOREIGN PATENTS

| | | |
|---|---|---|
| 566,647 | 4/58 | Belgium. |
| 960,469 | 10/49 | France. |

RICHARD A. GAUDET, *Primary Examiner.*